United States Patent
Sun et al.

(10) Patent No.: US 12,223,621 B2
(45) Date of Patent: Feb. 11, 2025

(54) VIRTUAL VIEWPOINT SYNTHESIS METHOD, ELECTRONIC APPARATUS, AND COMPUTER READABLE MEDIUM

(71) Applicants: Beijing BOE Optoelectronics Technology Co., Ltd., Beijing (CN); BOE Technology Group Co., Ltd., Beijing (CN)

(72) Inventors: Yan Sun, Beijing (CN); Minglei Chu, Beijing (CN); Tiankuo Shi, Beijing (CN); Yanhui Xi, Beijing (CN); Zhihua Ji, Beijing (CN); Yifan Hou, Beijing (CN); Chenxi Zhao, Beijing (CN); Shuo Zhang, Beijing (CN); Xiangjun Peng, Beijing (CN); Xiaomang Zhang, Beijing (CN); Wei Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 486 days.

(21) Appl. No.: 17/614,120

(22) PCT Filed: Jan. 25, 2021

(86) PCT No.: PCT/CN2021/073565
§ 371 (c)(1),
(2) Date: Nov. 24, 2021

(87) PCT Pub. No.: WO2022/155950
PCT Pub. Date: Jul. 28, 2022

(65) Prior Publication Data
US 2023/0162338 A1 May 25, 2023

(51) Int. Cl.
*G06T 5/50* (2006.01)
*G06T 7/13* (2017.01)
*G06T 7/55* (2017.01)

(52) U.S. Cl.
CPC ............... *G06T 5/50* (2013.01); *G06T 7/13* (2017.01); *G06T 7/55* (2017.01); *G06T 2207/10028* (2013.01); *G06T 2207/20221* (2013.01)

(58) Field of Classification Search
CPC .. G06T 7/55; G06T 7/593; G06T 7/50; G06T 5/50; G06T 7/13; G06T 5/77;
(Continued)

(56) References Cited

U.S. PATENT DOCUMENTS 8,817,069 B2 * 8/2014 Alessandrini ............ G06T 5/77
348/42
2010/0007661 A1 1/2010 Kim et al.
(Continued)

FOREIGN PATENT DOCUMENTS

CN 102436671 A 5/2012
CN 102592275 A * 7/2012
(Continued)

OTHER PUBLICATIONS

Yu, Li, et al. "Depth Based View Synthesis With Artifacts Removal for FTV"; Sixth International Conference on Image and Graphics; 2011.
(Continued)

*Primary Examiner* — Chan S Park
*Assistant Examiner* — Sebastian-Sy Vuchi Ngo
(74) *Attorney, Agent, or Firm* — Nath, Goldberg & Meyer; Joshua B. Goldberg

(57) ABSTRACT

The present disclosure provides a virtual viewpoint synthesis method, including: pre-processing a depth image with
(Continued)

zero parallax corresponding to an original image to obtain a processed depth image; generating virtual viewpoint images corresponding to a plurality of virtual viewpoints respectively according to the processed depth image and the original image; and filling holes in the virtual viewpoint image to generate a plurality of filled virtual viewpoint images. The present disclosure further provides an electronic apparatus and a computer-readable medium.

15 Claims, 7 Drawing Sheets

(58) Field of Classification Search
CPC ..... G06T 7/0002; G06T 7/174; G06V 40/172; G06V 40/161; G06V 2201/07; G06V 40/1365; H04N 2013/0074; H04N 2213/003; H04N 13/268; H04N 13/117; H04N 13/122
See application file for complete search history.

(56) References Cited

U.S. PATENT DOCUMENTS

| | | | |
|---|---|---|---|
| 2012/0120192 A1 | 5/2012 | Alregib et al. | |
| 2013/0342644 A1* | 12/2013 | Rusanovskyy | H04N 19/597 |
| | | | 348/43 |
| 2014/0002595 A1 | 1/2014 | Po et al. | |
| 2020/0279384 A1 | 9/2020 | Jia et al. | |
| 2021/0136354 A1* | 5/2021 | Valli | H04N 13/156 |

FOREIGN PATENT DOCUMENTS

| | | | | |
|---|---|---|---|---|
| CN | 102625127 A | 8/2012 | | |
| CN | 102724529 A | 10/2012 | | |
| CN | 103731657 A | 4/2014 | | |
| CN | 104378619 A | 2/2015 | | |
| CN | 104780355 A | 7/2015 | | |
| CN | 106060512 A | 10/2016 | | |
| CN | 106060522 A | 10/2016 | | |
| CN | 110660131 A | 1/2020 | | |
| CN | 111311521 A | 6/2020 | | |
| EP | 2775723 A1 | 9/2014 | | |
| EP | 3245793 B1 * | 12/2021 | ....... | H04N 21/21805 |
| KR | 20140037301 A | 3/2014 | | |

OTHER PUBLICATIONS

Weijian, Wang "Research on the virtual viewpoint synthesis algorithm based on the DIBR"; Huazhong University of Science & Technology; Wuhan, China; May 2016.
Wang, Laihua, et al. "View generation with DIBR for 3D display system"; Multimed Tools Appl 74:9529-9545; 2015.
Haitao, Liang, et al. "Virtual View Rendering Based on Depth Map Preprocessing and Image Inpainting"; Journal of Computer-Aided Design & Computer Graphics; vol. 31, No. 8; Aug. 2019.

* cited by examiner

VIRTUAL VIEWPOINT SYNTHESIS METHOD, ELECTRONIC APPARATUS, AND COMPUTER READABLE MEDIUM

This is a National Phase Application filed under 35 U.S.C. 371 as a national stage of PCT/CN2021/073565, filed Jan. 25, 2021, the content of each of which is hereby incorporated by reference in its entirety.

TECHNICAL FIELD

The present disclosure relates to the field of image and video technology, and in particular, to a virtual viewpoint synthesis method, an electronic apparatus, and a computer-readable medium.

BACKGROUND

With the development of image and video technology and display technology, 3D display technology has been widely concerned and applied, which enables a viewer to perceive a stereoscopic visual effect through parallax. When the viewer watches 3D display contents, the left eye and the right eye of the viewer simultaneously observe different parallax images, so that a stereoscopic image with a depth effect is perceived by fusion of the different parallax images in the brain.

In order to overcome the problems of few viewpoints, discontinuous viewpoints and the like in a 3D display technology, particularly, in a naked eye 3D display technology, researchers have proposed a multi-viewpoint naked eye 3D technology, which specifically uses grating image division to generate multi-viewpoint images, but in practical application of the technology, the multi-viewpoint images are difficult to be acquired, for example, when shooting is performed, multiple viewpoints correspond to multiple cameras, and shooting needs to be performed simultaneously, so that the number of the cameras is increased, and synchronization and calibration need to be performed on different cameras at the same time. At present, a technology that generates an image of a virtual viewpoint according to an image shot by a camera has the advantages of cost saving and small data transmission amount, and a Depth Image Based Rendering (DIBR) technology is mostly adopted to solve the data acquisition problem, so that the calculation is simple and the efficiency is high. However, the image quality, obtained through virtual viewpoint rendering and synthesis by using this technology, is low, and the corresponding viewing effect is not ideal.

SUMMARY

The present disclosure is directed to at least one of the technical problems in the related art, and provides a virtual viewpoint synthesis method, an electronic apparatus, and a computer-readable medium.

To achieve the above object, in a first aspect, an embodiment of the present disclosure provides a virtual viewpoint synthesis method, including:

pre-processing a depth image with zero parallax corresponding to an original image to obtain a processed depth image;

generating virtual viewpoint images corresponding to a plurality of virtual viewpoints respectively according to the processed depth image and the original image; and filling holes in the virtual viewpoint images to generate a plurality of filled virtual viewpoint images.

In some implementations, the pre-processing the depth image with zero parallax corresponding to the original image to obtain the processed depth image includes:

determining edge pixels in the depth image with zero parallax according to gradients of pixels in the depth image with zero parallax in a row direction;

determining n pixels adjacent to the edge pixels in the row direction as target pixels; and adjusting a depth value of each target pixel according to a maximum depth value of preset neighborhoods corresponding to the target pixels.

In some implementations, the filling the holes in the virtual viewpoint images and generating the plurality of filled virtual viewpoint images includes:

traversing all pixels of a background area in a target virtual viewpoint image to determine a hole of the background area, where the target virtual viewpoint image is any one of the virtual viewpoint images, and depth values corresponding to all pixels of the background area are less than or equal to a preset depth value threshold; and filling, for any hole in the background area, the hole according to pixel information of at least part of pixels adjacent to the hole in the row direction.

In some implementations, the target virtual viewpoint image includes a first side and a second side which are oppositely disposed in the row direction;

the traversing all pixels of the background area in the target virtual viewpoint image to determine the hole of the background area includes:

in response to that a virtual viewpoint corresponding to the target virtual viewpoint image is located at a first side of a reference viewpoint corresponding to the original image, traversing all pixels of the background area in an order from the first side to the second side;

in response to that the virtual viewpoint corresponding to the target virtual viewpoint image is located at a second side of the reference viewpoint, traversing all pixels of the background area in an order from the second side to the first side.

In some implementations, the filling, for any hole in the background area, the hole based on the pixel information of at least part of pixels adjacent to the hole in the row direction includes:

filling, for a row pixel corresponding to any row in the hole, the row pixel according to pixel information of two pixels which are closest to the row pixel in the row direction.

In some implementations, the filling, for a row pixel corresponding to any row in the hole, the row pixel according to pixel information of two pixels which are closest to the row pixel in the row direction includes:

in response to that the two pixels belong to a same parallax plane, filling the row pixel by a linear interpolation according to the pixel information of the two pixels; and in response to that the two pixels do not belong to the same parallax plane, filling the row pixel according to the pixel information of one of the two pixels with a minimum depth value.

In some implementations, whether the two pixels belong to the same parallax plane is determined according to depth values corresponding to the two pixels.

In some implementations, the generating the virtual viewpoint images corresponding to the plurality of virtual viewpoints respectively according to the processed depth image and the original image includes:

determining a distance value corresponding to each pixel in the processed depth image according to the depth value of each pixel in the processed depth image;

for any to-be-filled virtual viewpoint image in each virtual viewpoint image, determining a parallax value corresponding to each pixel in the to-be-filled virtual viewpoint image according to a corresponding focal length, a corresponding baseline width and the distance value corresponding to each pixel in the processed depth image; and determining, for the pixel in the to-be-filled virtual viewpoint image, a corresponding point of the pixel in the original image according to the corresponding parallax value of the pixel, and filling the pixel according to the pixel information of the corresponding point.

In some implementations, the determining, for the pixel in the to-be-filled virtual viewpoint image, a corresponding point of the pixel in the original image according to the corresponding parallax value of the pixel, and filling the pixel according to the pixel information of the corresponding point includes:

in response to that a plurality of corresponding points exist in the original image for a single pixel in the to-be-filled virtual viewpoint image, filling the single pixel according to the pixel information of one of the corresponding points with a largest depth value.

In a second aspect, an embodiment of the present disclosure provides an electronic apparatus, including:

one or more processors;

a memory configured to store one or more programs;

the one or more programs, when being executed by the one or more processors, cause the one or more processors to implement the virtual viewpoint synthesis method of the embodiment described above.

In a third aspect, an embodiment of the present disclosure provides computer-readable medium, in which a computer program is stored which, when being executed by a processor, causes steps of the virtual viewpoint synthesis method according to the embodiment described above to be implemented.

DRAWINGS

DETAILED DESCRIPTION

In order to make those skilled in the art better understand the technical solutions of the present disclosure, the virtual viewpoint synthesis method, the electronic apparatus, and the computer-readable medium provided in the present disclosure are described in detail below with reference to the accompanying drawings.

Example embodiments will be described more fully hereinafter with reference to the accompanying drawings, but which may be embodied in different forms and should not be construed as limiting the present disclosure. Rather, these embodiments are provided so that this disclosure will be more thorough and complete, and will fully convey the scope of the disclosure to those skilled in the art.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" and/or "include" when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another. Thus, a first element, a first component, or a first module discussed below could be termed a second element, a second component, or a second module without departing from the teachings of the present disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The virtual viewpoint synthesis method, the electronic apparatus and the computer-readable medium provided by the present disclosure can be used for generating the virtual viewpoint image corresponding to the virtual viewpoint based on the original image according to a processed depth image obtained by pre-processing the depth image with zero parallax corresponding to the original image, and filling a hole in the virtual viewpoint image, thereby realizing the fast and effective hole repairing of the virtual viewpoint image and improving the image quality.

Figure 1:
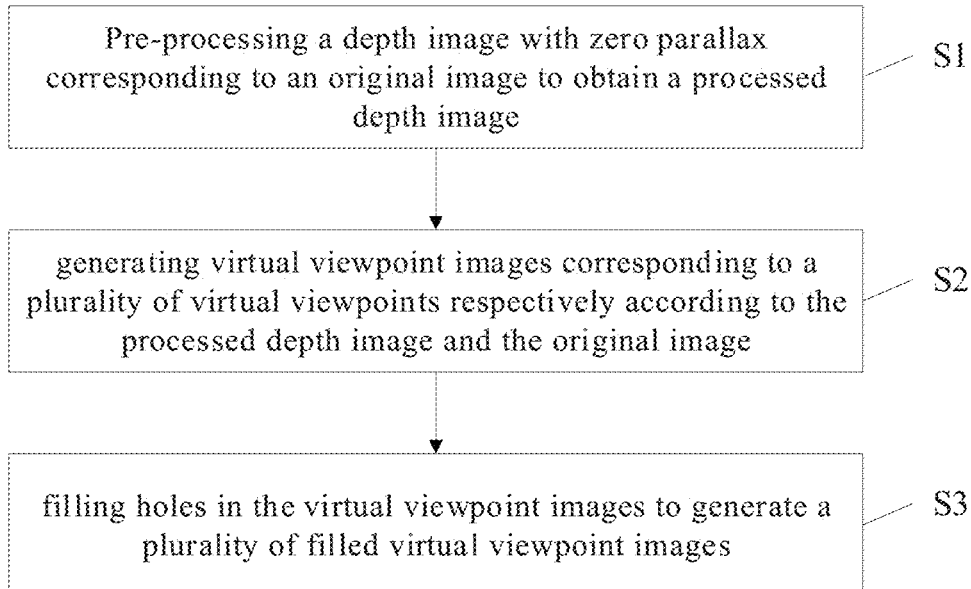
FIG. 1 is a flowchart of a virtual viewpoint synthesis method provided in an embodiment of the present disclosure.

FIG. 1 is a flowchart of a virtual viewpoint synthesis method according to an embodiment of the present disclosure. As shown in FIG. 1, the method includes steps S1 to S3.

In the step S1, a depth image with zero parallax corresponding to an original image is pre-processed to obtain a processed depth image.

In the step S1, the depth image is pre-processed to achieve the functions such as smoothing texture, reducing distortion of depth values, repairing holes, extracting features, and separating foreground and background.

In some implementations, the depth image adopts a 8-bit grayscale value to represent a distance between a pixel of the image and a reference viewpoint corresponding to the original image, that is, the distance between the pixel and the reference viewpoint corresponding to zero parallax, where the grayscale value is a depth value in the depth image, and the smaller the depth value, the farther it is from the reference viewpoint, accordingly, the larger the depth value, the closer it is to the reference viewpoint, that is, a pixel grayscale value of 255 represents that the pixel is closest to the reference viewpoint, and a pixel grayscale value of 0 represents that the pixel is farthest from the reference viewpoint, but the depth value and the distance value are not the same, and can be converted into each other through a corresponding algorithm.

In some implementations, the depth image may be calculated by software based on rendering of the original image, or may be directly captured by an image capture device with a depth image capturing and generating function, such as a depth camera, where the reference viewpoint corresponds to the image capture device that is used as a reference or is at a reference position during the capture.

In some implementations, the depth image may be pre-processed by bilateral filtering, feature map segmentation, edge detection, and object recognition and the like.

In some implementations, in the step S1, before the depth image with zero parallax corresponding to the original image is pre-processed to obtain the processed depth image, it is further included that: acquiring an original image and a depth image corresponding to the reference viewpoint with zero parallax.

In the step S2, virtual viewpoint images corresponding to a plurality of virtual viewpoints respectively are generated according to the processed depth image and the original image.

In the step S2, the virtual viewpoint images corresponding to the respective virtual viewpoints are generated based on the original image according to the depth image pre-processed in the step S1.

In some implementations, in the step S2, before the respective virtual viewpoint images corresponding to the plurality of virtual viewpoints are generated according to the processed depth image and the original image, it is further included that: acquiring a plurality of virtual viewpoints having spatial positions different from that of the reference viewpoint.

In some implementations, pixel filling is performed according to the processed depth image and the original image corresponding to the reference viewpoint, so as to generate virtual viewpoint images corresponding to the virtual viewpoints; in some implementations, pixel filling is performed by a depth image-based virtual viewpoint rendering technique; or, in some implementations, the virtual viewpoint images corresponding to the virtual viewpoints are generated through depth value information conversion and pixel information conversion according to the depth value information of the processed depth image and pixel information of the original image corresponding to the reference viewpoint.

In some implementations, the virtual viewpoint is determined by obtaining reference coordinates corresponding to the virtual viewpoint, or obtaining relative coordinates of the virtual viewpoint with respect to the reference viewpoint, or obtaining a width of a baseline between the virtual viewpoint and the reference viewpoint.

In some implementations, the original image is a color image.

In the step S3, holes in the virtual viewpoint images are filled to generate a plurality of filled virtual viewpoint images.

The virtual viewpoint image generated in the step S2 has a hole, and the final virtual viewpoint image corresponding to the virtual viewpoint is generated after the hole is filled; the hole is a continuous hole corresponding to a plurality of pixels with null pixel information, or, in some implementations, the hole is a continuous hole corresponding to a plurality of pixels with extreme pixel information.

In some implementations, in the step S3, after filling the holes in the virtual viewpoint images to generate the plurality of filled virtual viewpoint images, it is further included that: performing image fusion and three-dimensional scene reconstruction on the original image and the plurality of filled virtual viewpoint images according to the reference viewpoint and the virtual viewpoints to generate a fused image and display the fused image.

The embodiment of the disclosure provides the virtual viewpoint synthesis method, which can be used for pre-processing a depth image with zero parallax corresponding to an original image, then generating the virtual viewpoint images corresponding to the virtual viewpoints based on the original image according to the processed depth image, and filling the holes in the virtual viewpoint images, so that the holes can be quickly and effectively repaired for the virtual viewpoint mages, and the image quality can be improved.

Figure 2:
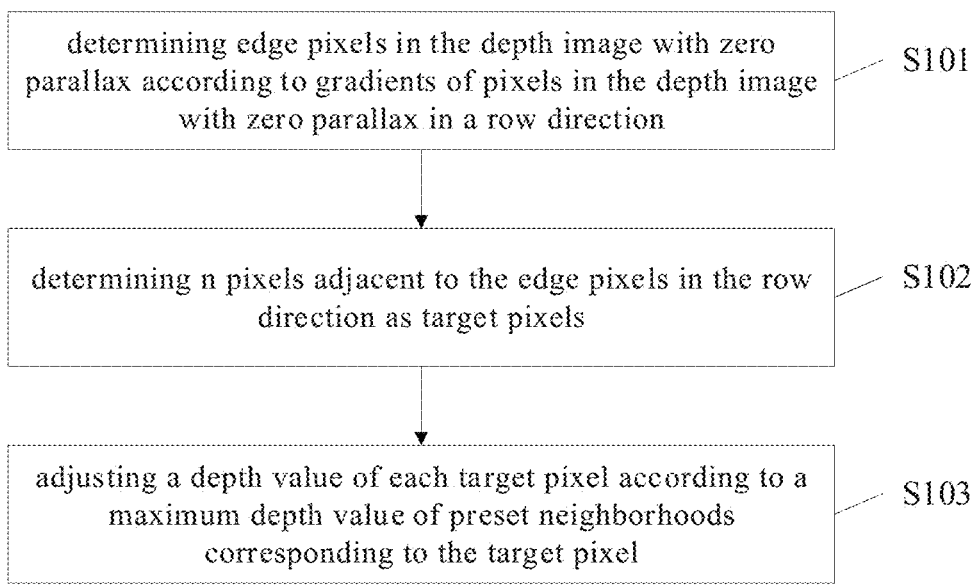
FIG. 2 is a schematic flowchart of step S1 according to an embodiment of the present disclosure.

FIG. 2 is a schematic flowchart of the step S1 according to an embodiment of the present disclosure. As shown in FIG. 2, specifically, in the step S1, the pre-processing the depth image with zero parallax corresponding to the original image to obtain the processed depth image includes step S101 to step S103.

In the step S101, an edge pixel in the depth image with zero parallax is determined according to a gradient of each pixel m the depth image with zero parallax in a row direction.

The edge pixel is located at a foreground edge position of the depth image, and the foreground edge position is an edge portion of each object in a foreground area; in some implementations, the depth values corresponding to all pixels in the foreground area are greater than or equal to a preset depth value threshold; in some implementations, the edge pixel is determined by calculating a gradient of each pixel in the depth image and comparing the gradient with a preset gradient threshold.

In some implementations, the virtual viewpoint is determined in the step S2 in a manner of horizontal shift, i.e., warping is performed in a horizontal direction based on the reference viewpoint to determine the virtual viewpoint, and thus, only the gradient of each pixel in the row direction is calculated and compared with the preset gradient threshold to determine the edge pixel.

In the step S102, n pixels adjacent to the edge pixel in the row direction are determined as target pixels, where n is a positive integer.

In some implementations, the depth image includes a first side and a second side arranged opposite to each other in the row direction, n pixels adjacent to a particular pixel in the row direction are n pixels located at the first side and the second side of the particular pixel.

In some implementations, for any edge pixel in the depth image at the foreground edge position, n pixels on the first side and m pixels on the second side thereof are determined as the target pixels, where n and m are positive integers, and in some implementations, n and m are equal to each other.

Figure 3:
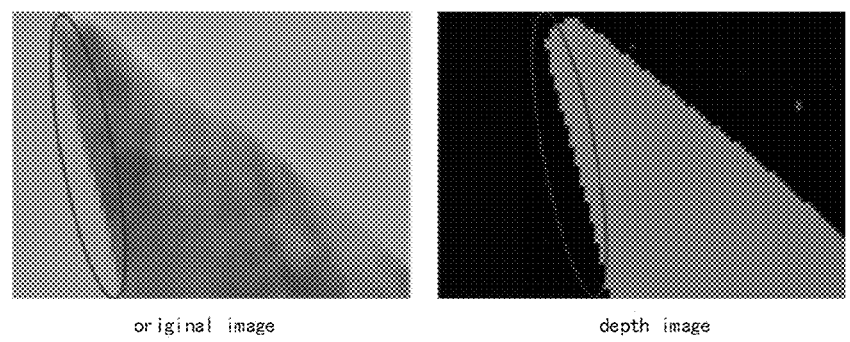
FIG. 3 is a schematic diagram of edge positions of an original image and a depth image according to an embodiment of the present disclosure.

FIG. 3 is a schematic diagram of edge positions of an original image and a depth image according to an embodiment of the present disclosure. As shown in FIG. 3, the circled portions in the figure are edge positions of the original image and the depth image, respectively, in the original image, in particular, in the color image, the pixel information corresponding to the edge portions of the objects is gradually changed, the width of the edge portion is one or more pixels, and in some implementations, a width of the edge portion of the object corresponds to one to three pixels; in the depth image, the pixel information corresponding to the edge portion of the object abruptly changes; for the original image and the depth image, if the pixel information corresponding to the foreground edge positions of the original image and the depth image are asynchronous, when the virtual viewpoint is synthesized, the foreground edge positions of the depth image are mapped onto the virtual viewpoint image corresponding to the virtual viewpoint as the background, and therefore artifact noise occurs.

Figure 4:
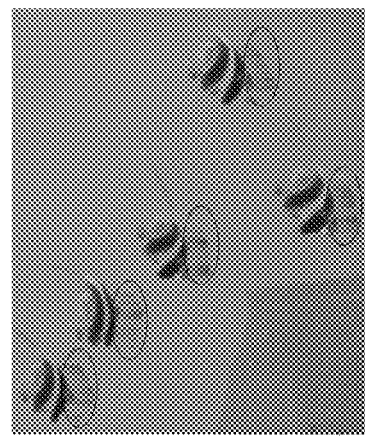
FIG. 4 is a schematic diagram of artifact noise according to an embodiment of the present disclosure.

FIG. 4 is a schematic diagram of artifact noise according to an embodiment of the present disclosure. As shown in FIG. 4, circled portions in the figure are the artifact noise in the virtual viewpoint image, pixel information corresponding to the edge portion of the foreground object appears at a position that is supposed to be the background area, and thus artifact noise occurs.

In the step S103, the depth value of each target pixel is adjusted according to a maximum depth value of a preset neighborhood corresponding to the target pixel.

The depth values of the preset neighborhood are the depth values corresponding to all pixels in the preset neighborhood; and thus the depth value of each target pixel is adjusted according to the maximum value of the depth values of the preset neighborhoods corresponding to the target pixel. Therefore, the foreground edge of the depth image is expanded, abrupt change of pixel information corresponding to the foreground edge position of the depth image is reduced, and when the virtual viewpoint image is generated in the subsequent step S2, the holes on the side edge of each object in the foreground area is cut apart from the object, that is, the left side and the right side of the hole are both background areas, so that hole repairing is facilitated while the pixel information of the foreground area is not influenced.

In some implementations, the method further includes: adjusting the depth value of the target pixel according to an average value of the depth values of the preset neighborhoods, or according to weight information of the depth values of the preset neighborhoods.

The embodiment of the disclosure provides the virtual viewpoint synthesis method, which can be used to determine a plurality of pixels adjacent to an edge pixel at a foreground edge position in a row direction as target pixels, adjust a depth value of each target pixel according to a depth value of a preset neighborhood corresponding to the target pixel, and implement pre-processing on a depth image, so as to avoid poor effect in subsequent virtual viewpoint synthesis due to low precision of the depth image, smooth a foreground edge of the depth image, avoid noise generation in virtual viewpoint synthesis due to abrupt change of pixel information, and adjust the depth value of each target pixel according to a maximum value of depth values of preset neighborhoods corresponding to the target pixel, so that left and right sides of a hole generated after synthesis are both background areas.

Figure 5:
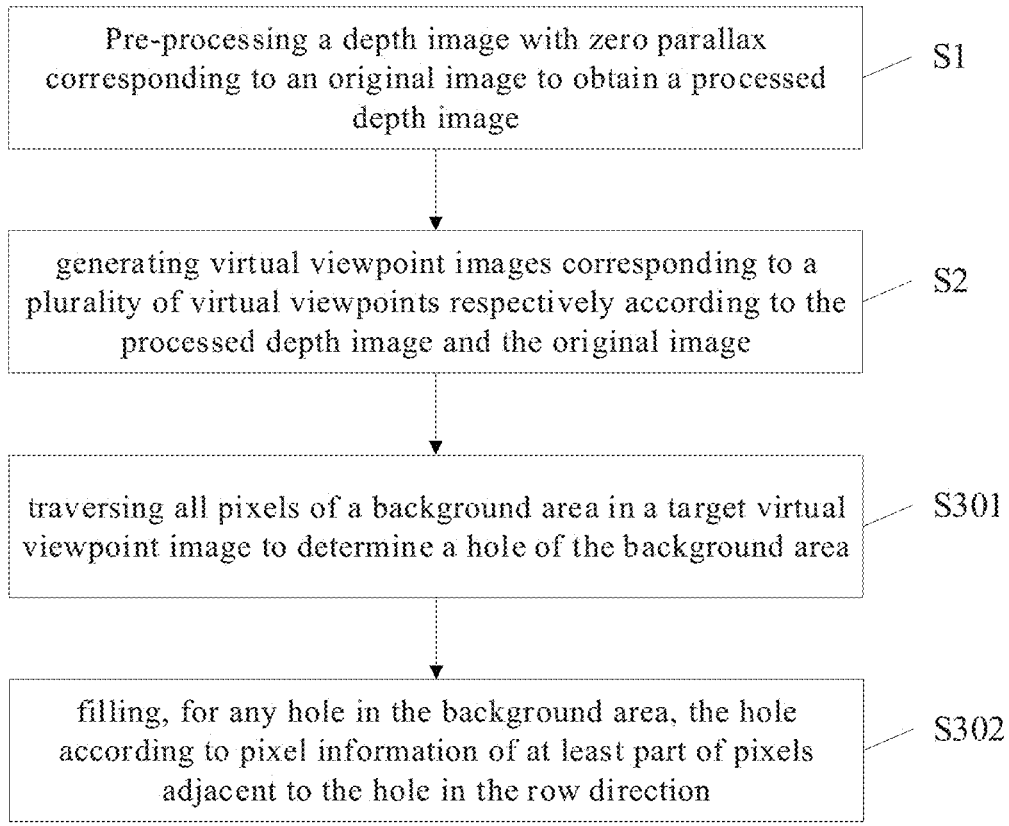
FIG. 5 is a flowchart of a virtual viewpoint synthesis method provided in another embodiment of the present disclosure.

FIG. 5 is a flowchart of a virtual viewpoint synthesis method according to another embodiment of the present disclosure. The method is an implementation based on the method shown in FIG. 2. As shown in FIG. 5, in the case where the step S1 includes the steps S101 to S103, the method includes not only the step S1 and the step S2, but also a step S301 and a step S302, where the step S301 and the step S302 are an implementation of the step S3. Only the step S301 and the step S302 will be described in detail below.

In the step S301, all pixels of the background area in the target virtual viewpoint image are traversed to determine the holes of the background area.

The target virtual viewpoint image is any one of the virtual viewpoint images, and the depth values corresponding to all pixels of the background area are less than or equal to a preset depth value threshold; based on the pre-processing on the depth image in the step S101 to the step S103, in the virtual viewpoint image generated in the step S2, except for the hole inside the foreground area, a left side and a right side of each of the remaining holes (i.e., the holes of the background area,) are both background areas, and the holes near the edge of the foreground area also conform to such characteristic.

Figure 6:
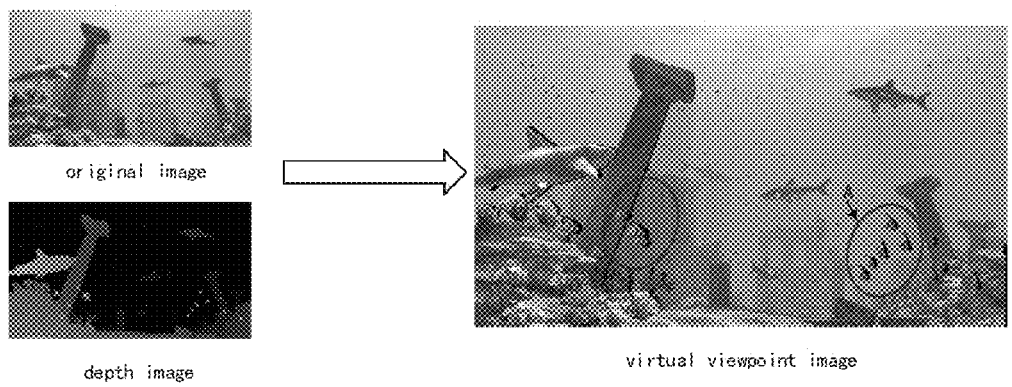
FIG. 6 is a schematic flowchart of step S2 according to an embodiment of the present disclosure.

FIG. 6 is a schematic flowchart of the step S2 according to an embodiment of the present disclosure. As shown in FIG. 6, in the step S2, a virtual viewpoint image is generated according to the processed depth image and the original image. It should be noted that the relationship of image sizes of the original image, the depth image, and the virtual viewpoint image shown in the figure is generated based on a drawing layout manner selected for convenience of description, which does not limit the technical solution provided by the embodiments of the present disclosure. In some implementations, the image sizes of the original image and the depth image are equal to each other, and the image size of the virtual viewpoint image is equal to or not equal to the image sizes of the original image and the depth image.

Figure 7:
FIG. 7 is a schematic diagram of a part A of a virtual viewpoint image shown in FIG. 6.

FIG. 7 is a schematic view of a portion A of the virtual viewpoint image shown in FIG. 6. As shown in FIG. 7, the circled portions, with pixel information that is null, in the figure are holes near the foreground edge position. The holes near the foreground edge position are generated, when mapping the pixel information of the virtual viewpoint image, due to the lack of mappable pixel information of a part of the pixels, especially at the edge positions, corresponding to the original pixel positions, which is caused by the warping of the object in the foreground area of the original image.

In the step S302, for any hole in the background area, the hole is filled according to the pixel information of at least part of the pixels adjacent to the hole in the row direction.

For the hole near the foreground edge position, the hole may be filled and repaired according to the pixel information of the pixels in the background areas on the left and right sides of the hole, and in conjunction with the steps S101 to S103, and S301 and S302, filling the holes with the pixel information corresponding to the foreground area is avoided.

In some implementations, the target virtual viewpoint image includes a first side and a second side which are oppositely arranged in the row direction, and at least part of pixels may be selected from all pixels on the first side and the second side of the hole in a nearest neighbor interpolation manner for repairing the hole; or, at least part of pixels may be selected according to a weight information corresponding to the pixels positioned at the first side and the second side of the hole for repairing the hole; or, at least part of the pixels may be selected for repairing the hole according to the depth values corresponding to the pixels located on the first side and the second side of the hole.

The embodiment of the disclosure provides the virtual viewpoint synthesis method, which can be used for repairing the hole by using pixel information of pixels in background areas on both sides of the hole based on the foregoing pre-processing, on the premise that both sides of the hole are the background areas, so that the hole is prevented from being filled by using pixel information corresponding to the foreground area.

Figure 8:
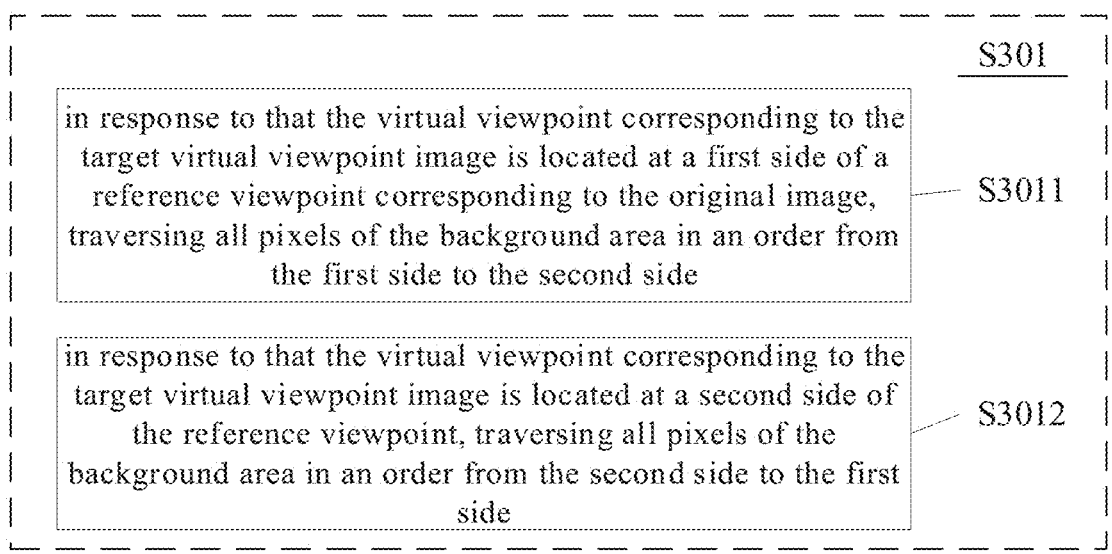
FIG. 8 is a flowchart illustrating a specific implementation of step S301 in an embodiment of the present disclosure.

FIG. 8 is a flowchart of a specific implementation of the step S301 in an embodiment of the present disclosure. Specifically, the target virtual viewpoint image includes a first side and a second side which are oppositely disposed in the row direction; as shown in FIG. 8, in the step S301, the traversing all pixels of the background area in the target virtual viewpoint image to determine a hole of the background area includes step S3011 and step S3012.

In the step S3011, in response to that the virtual viewpoint corresponding to the target virtual viewpoint image is located on the first side of the reference viewpoint corresponding to the original image, all pixels of the background area are traversed in an order from the first side to the second side.

In the step S3012, in response to that the virtual viewpoint corresponding to the target virtual viewpoint image is located on the second side of the reference viewpoint, all pixels of the background area are traversed in an order from the second side to the first side.

Therefore, the pixel information corresponding to the foreground area in the target virtual viewpoint image is prevented from being wrongly classified into the hole; when mapping the pixel information of the virtual viewpoint image, the warping is performed based on the original image according to the position relationship between the virtual viewpoint and the reference viewpoint, that is, when the virtual viewpoint is positioned at the first side of the reference viewpoint, the hole which is generated near the foreground edge position in the virtual viewpoint image is positioned at the first side of the foreground object, and correspondingly, when the virtual viewpoint is positioned at the second side of the reference viewpoint, the hole which is generated near the foreground edge position in the virtual viewpoint image is positioned at the second side of the foreground object.

Figure 9:
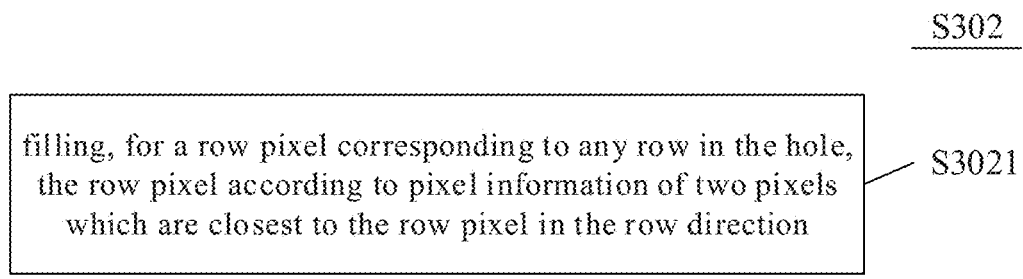
FIG. 9 is a flowchart illustrating a specific implementation of step S302 in an embodiment of the present disclosure.

FIG. 9 is a flowchart of a specific implementation of the step S302 in an embodiment of the present disclosure. Specifically, as shown in FIG. 9, in the step S302, for any hole in the background area, the filling the hole according to the pixel information of at least part of the pixels adjacent to the hole in the row direction includes a step S3021.

In the step S3021, row pixels in the hole corresponding to any row are filled based on the pixel information of two pixels closest to the row pixels in the row direction.

The row pixels are all the pixels in the corresponding row in the hole, and the two pixels closest to the row pixels in the row direction both are pixels in the background area.

Figure 10:
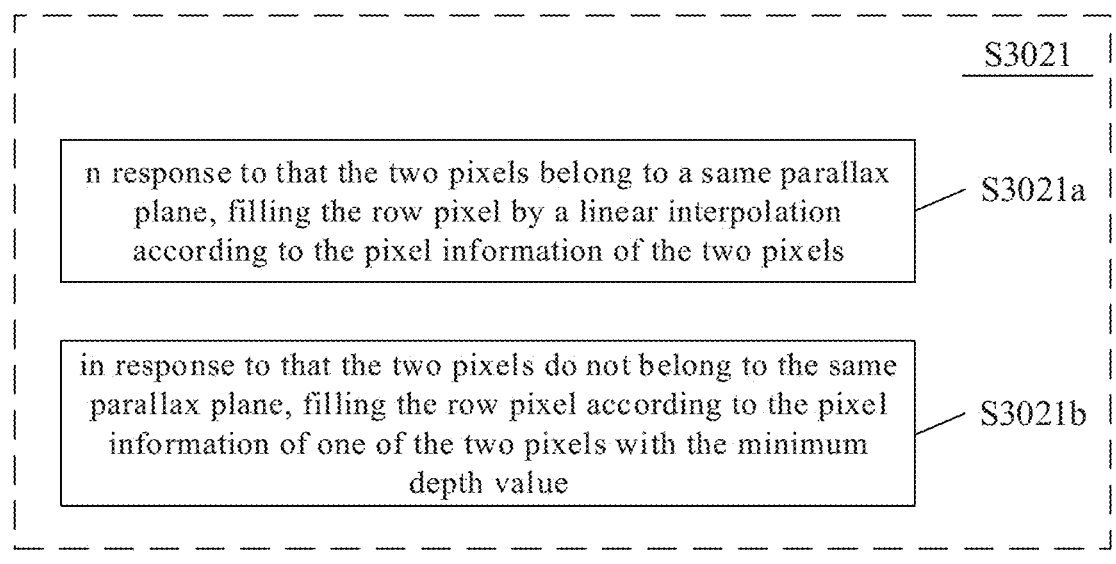
FIG. 10 is a flowchart illustrating a specific implementation of step S3021 in an embodiment of the present disclosure.

FIG. 10 is a flowchart of a specific implementation of the step S3021 in an embodiment of the present disclosure. Specifically, as shown in FIG. 10, in the step S3021, the filling the row pixels in the hole corresponding to any row according to the pixel information of two pixels closest to the row pixels in the row direction includes a step S3021a and a step S3021b.

In the step S3021a, in response to that the two pixels belong to a same parallax plane, the row pixels are filled by linear interpolation according to the pixel information of the two pixels.

In the step S3021b, in response to that the two pixels do not belong to the same parallax plane, the row pixels are filled according to the pixel information of one of the two pixels with the smallest depth value.

In some implementations, when the hole to be repaired is near the edge position of the foreground, if the two pixels on two sides of the hole do not belong to the same parallax plane and are at different distances from the virtual viewpoint, the two pixels are not synchronized, and the pixel information of the pixel closer to the virtual viewpoint is more approximate to the pixel information corresponding to the foreground area. Thus, in order to ensure that the hole is repaired by using the pixel information of the background area, when the two pixels do not belong to the same parallax plane, the pixel information of the pixel with a smaller depth value is used to repair the hole for the row pixels in a corresponding row of the hole.

In some implementations, in the step S3021a and the step 3021b, it is determined whether the two pixels belong to the same parallax plane according to the depth values corresponding to the two pixels.

Figure 11:
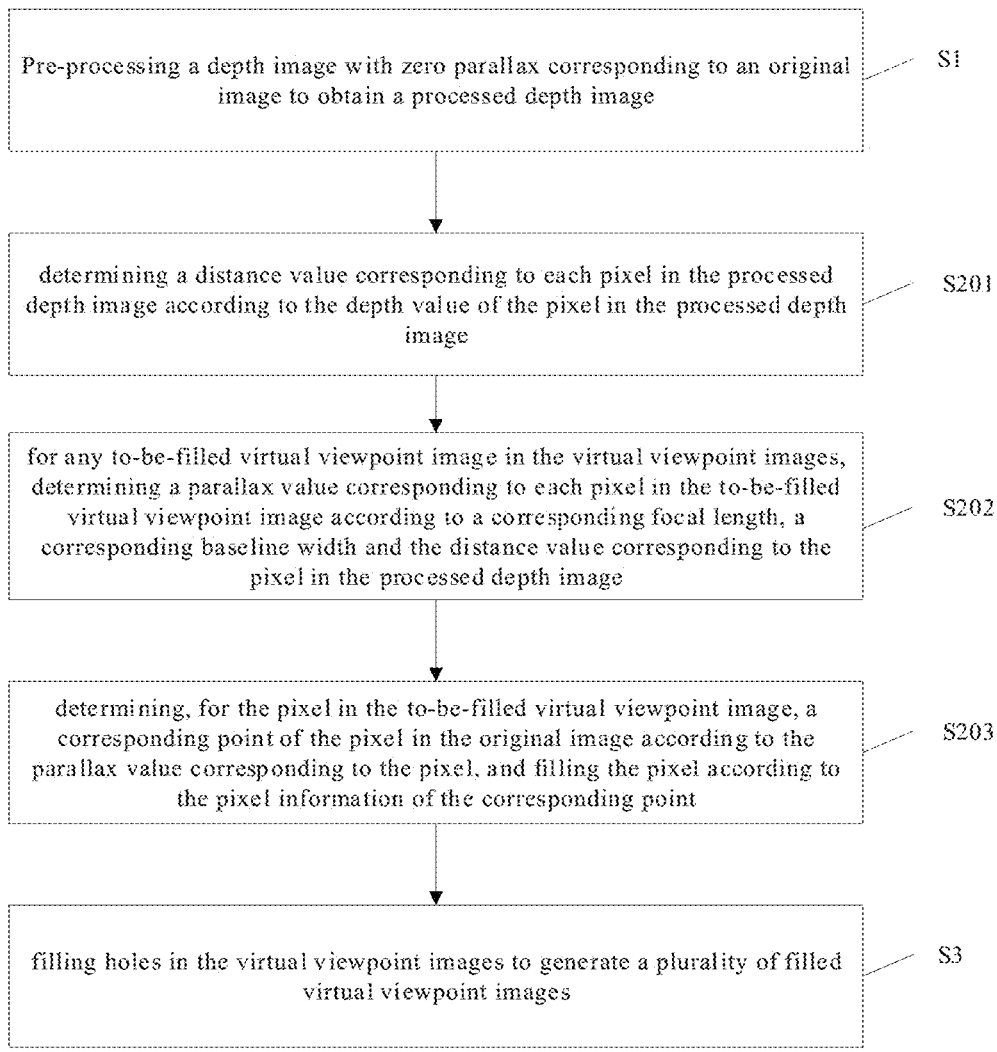
FIG. 11 is a flowchart of a virtual viewpoint synthesis method according to another embodiment of the present disclosure.

FIG. 11 is a flowchart of a virtual viewpoint synthesis method according to another embodiment of the present disclosure. As shown in FIG. 11, the method is an implementation based on the method shown in FIG. 1. The method includes not only the steps S1 and S3, but also the steps S201 to S203, where the steps S201 to S203 are an implementation of the step S2. Only the steps S201 to S203 will be described in detail below.

In the step S201, a distance value corresponding to each pixel in the processed depth image is determined according to the depth value of each pixel in the processed depth image.

In some implementations, the method further includes determining a zero-parallax plane, where the zero-parallax plane is a plane area that coincides with a display screen after image fusion and three-dimensional scene reconstruction are performed according to the original image and the virtual viewpoint image, and in some implementations, a corresponding length of the zero-parallax plane is infinite, and the length is an adjustable parameter in practical applications, and is used to adjust a screen-out and screen-in range when the final image is displayed.

In some implementations, the depth value may be converted into the distance value in a linear manner or a non-linear manner, where the distance value corresponds to an actual distance.

Specifically, the depth value is converted into the distance value through the linear manner by using the following formula:

$$Z(i, j) = (Z_{near} - Z_{far}) * \frac{D(i, j)}{255} + Z_{far},$$

where i and j are coordinate values of the pixel, $D(i, j)$ and $Z(i, j)$ respectively represent the depth value and the distance value corresponding to the pixel, $Z_{near}$ and $Z_{far}$ each are a preset distance value or a fixed value acquired in advance and respectively corresponds to a minimum actual distance and a maximum actual distance.

Alternatively, the depth value is converted into the distance value through the nonlinear manner by using the following formula:

$$Z(i, j) = \frac{1}{\left(\frac{1}{Z_{near}} - \frac{1}{Z_{far}}\right) * \frac{D(i, j)}{255} + \frac{1}{Z_{far}}}.$$

In the step S202, for any to-be-filled virtual viewpoint image in the virtual viewpoint images, a parallax value corresponding to each pixel in the to-be-filled virtual viewpoint image is determined according to a corresponding focal length, a corresponding baseline width, and the distance value corresponding to each pixel in the processed depth image.

The focal length is a preset value or a fixed value obtained in advance, the baseline width represents the distance between the virtual viewpoint and the reference viewpoint, and in some implementations, the baseline width is a horizontal distance between projections of the virtual viewpoint corresponding to the virtual viewpoint image and the reference viewpoint on the zero-parallax plane.

In some implementations, the parallax value is determined by adopting the following formula:

$$Dis(i, j) = F * B * \left(\frac{1}{Z(i, j)} - \frac{1}{Z_{zero}}\right),$$

where Dis(i, j) represents the parallax value corresponding to the pixel, F is the focal length, B is the baseline width, and $Z_{zero}$ is the zero parallax plane.

In the step S203, for the pixel in the to-be-filled virtual viewpoint image, a corresponding point in the original image is determined according to the parallax value corresponding to the pixel, and the pixel is filled according to the pixel information of the corresponding point.

In some implementations, the corresponding point in the original image is determined for the pixel in the to-be-filled virtual viewpoint image by using the following formula, and the pixel is filled according to the pixel information of the corresponding point:

Virtual[(i, j)+dire*Dis(i, j)]=RGB(i, j), where dire is an adjustment parameter, and dire=±1, the dire is negative in response to that the virtual viewpoint is positioned on the right side of the reference viewpoint, and the dire is positive in response to that the virtual viewpoint is positioned on the left side of the reference viewpoint; Virtual ( ) represents the pixel in the virtual viewpoint image; the original image is a color image, and the color space thereof is an RGB space, RGB(i, j) is the corresponding point in the original image corresponding to the pixel in the virtual viewpoint image.

Figure 12:
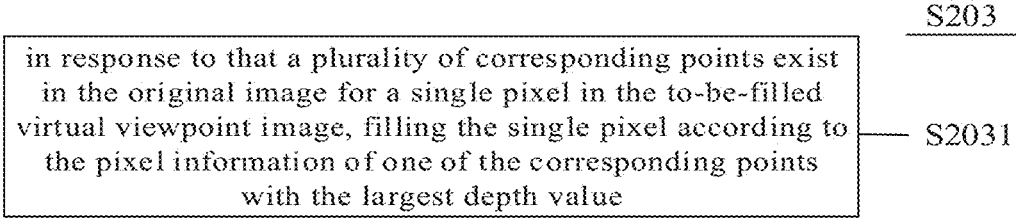
FIG. 12 is a flowchart illustrating a specific implementation of step S203 in an embodiment of the present disclosure.

FIG. 12 is a flowchart of a specific implementation of the step S203 in an embodiment of the present disclosure. Specifically, as shown in FIG. 12, in the step S203, the determining, for the pixel in the to-be-filled virtual viewpoint image, the corresponding point in the original image according to the corresponding parallax value, and filling the pixel according to the pixel information of the corresponding point, includes a step S2031.

In the step S2031, in response to that a plurality of corresponding points exist in the original image for a single pixel in the to-be-filled virtual viewpoint image, the single pixel is filled according to the pixel information of the corresponding point having the largest depth value among the plurality of corresponding points.

In order to ensure that the foreground area in the to-be-filled virtual viewpoint image cannot be obscured by the background area, when the plurality of corresponding points exist in the original image for the single pixel in the to-be-filled virtual viewpoint image, the single pixel is filled according to the pixel information of the corresponding point with the maximum depth value.

In some implementations, the method further includes: in response to that a plurality of consecutive pixels in the to-be-filled virtual viewpoint image do not have any corresponding point the original image, the plurality of consecutive pixels are determined to be holes.

Figure 13:
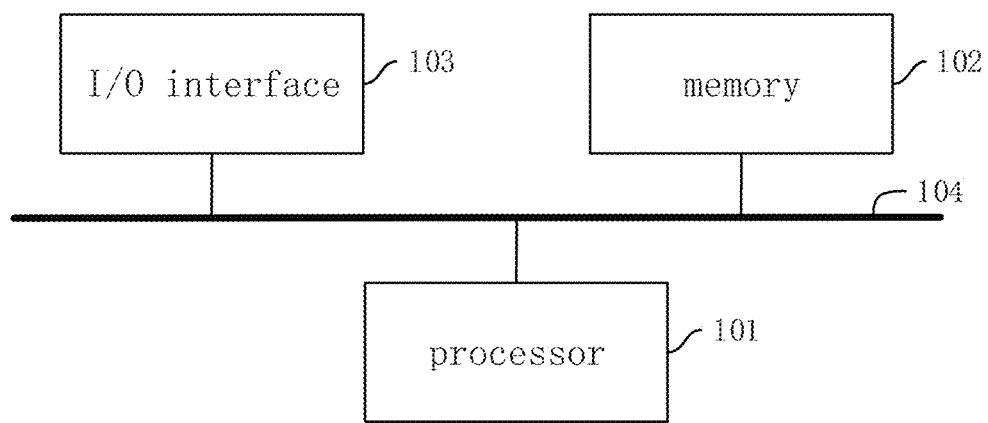
FIG. 13 is a schematic structural diagram of an electronic apparatus according to an embodiment of the present disclosure.

FIG. 13 is a schematic structural diagram of an electronic apparatus according to an embodiment of the present disclosure. As shown in FIG. 13, the electronic apparatus includes:

one or more processors 101;

a memory (device) 102 in which one or more programs are stored, which when executed by the one or more processors, cause the one or more processors to implement the virtual viewpoint synthesis method in any one of the above embodiments; and one or more I/O interfaces 103 coupled between the one or more processors and the memory and configured to realize information interaction between the one or more processors and the memory.

The processor 101 is a device with data processing capability, which includes but is not limited to a Central Processing Unit (CPU), etc.; the memory 102 is a device having data storage capabilities including, but not limited to, random access memory (RAM, more specifically SDRAM, DDR, etc.), Read Only Memory (ROM), Electrically Erasable Programmable Read Only Memory (EEPROM), FLASH; the I/O interface (reading/writing interface) 103 is coupled between the processor 101 and the memory 102, and can realize information interaction between the processor 101 and the memory 102, which includes but is not limited to a data Bus and the like.

In some implementations, the processor 101, the memory 102, and the I/O interface 103 are interconnected via the bus 104, and then are coupled with other components of a computing device.

In some implementations, the electronic apparatus may be a display for displaying an image, the displayed image includes: the original image, the depth image, the virtual viewpoint image, and the fused image generated by performing image fusion and three-dimensional scene reconstruction on the original image and the virtual viewpoint image according to the reference viewpoint and the virtual viewpoint, and the like.

Figure 14:
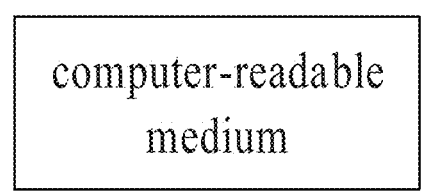
FIG. 14 is a schematic structural diagram of a computer-readable medium according to an embodiment of the present disclosure.

FIG. 14 is a schematic structural diagram of a computer-readable medium according to an embodiment of the present disclosure. The computer-readable medium has a computer program stored thereon, where the program, when executed by the processor, implements the steps in the virtual viewpoint synthesis method according to any one of the above embodiments.

It will be understood by those of ordinary skill in the art that all or some of the steps of the methods, functional modules/units in the apparatus, disclosed above may be implemented as software, firmware, hardware, and suitable combinations thereof. In a hardware implementation, the division between functional modules/units mentioned in the above description does not necessarily correspond to the division of physical components; for example, one physical component may have multiple functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on a computer-readable medium which may include computer storage medium (or non-transitory medium) and communication medium (or transitory medium). As is well known to those of ordinary skill in the art, the term computer storage medium includes volatile and nonvolatile, removable and non-removable medium implemented in any method or technology for storage of information, such as computer-readable instructions, data structures, program modules or other data. Computer storage medium includes, but is not limited to, RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices, or any other medium which can be used to store the desired information and which can be accessed by a computer. In addition, the communication medium typically contains computer-readable instructions, data structures, program modules, or other data in modulated data signals such as carriers or other transmission mechanisms, and may include any information delivery medium, as is well known to those skilled in the art.

Example embodiments have been disclosed herein, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the disclosure as set forth in the appended claims.

The invention claimed is:

1. A virtual viewpoint synthesis method, comprising:
Pre-processing a depth image with zero parallax corresponding to an original image to obtain a processed depth image;
generating virtual viewpoint images corresponding to a plurality of virtual viewpoints respectively according to the processed depth image and the original image; and
filling holes in the virtual viewpoint images to generate a plurality of filled virtual viewpoint images,
wherein the pre-processing the depth image with zero parallax corresponding to the original image to obtain the processed depth image comprises:
determining edge pixels in the depth image with zero parallax according to gradients of pixels in the depth image with zero parallax in a row direction;
determining n pixels adjacent to the edge pixels in the row direction as target pixels; and
adjusting a depth value of each target pixel according to a maximum depth value of preset neighborhoods corresponding to the target pixels,
the filling the holes in the virtual viewpoint images and generating the plurality of filled virtual viewpoint images comprises:
traversing all pixels of a background area in a target virtual viewpoint image to determine a hole of the background area, wherein the target virtual viewpoint image is any one of the virtual viewpoint images, and depth values corresponding to all pixels of the background area are less than or equal to a preset depth value threshold; and
filling, for any hole in the background area, the hole according to pixel information of at least part of pixels adjacent to the hole in the row direction,
the filling, for any hole in the background area, the hole based on the pixel information of at least part of pixels adjacent to the hole in the row direction comprises:
filling, for a row pixel corresponding to any row in the hole, the row pixel according to pixel information of two pixels which are closest to the row pixel in the row direction, and
wherein the filling, for the row pixel corresponding to any row in the hole, the row pixel according to pixel information of two pixels which are closest to the row pixel in the row direction comprises:
in response to that the two pixels belong to a same parallax plane, filling the row pixel by a linear interpolation according to the pixel information of the two pixels; and
in response to that the two pixels do not belong to the same parallax plane, filling the row pixel according to the pixel information of one of the two pixels with a minimum depth value.

2. The virtual viewpoint synthesis method according to claim 1, wherein the target virtual viewpoint image comprises a first side and a second side which are oppositely disposed in the row direction;
the traversing all pixels of the background area in the target virtual viewpoint image to determine the hole of the background area comprises:
in response to that the virtual viewpoint corresponding to the target virtual viewpoint image is located at a first side of a reference viewpoint corresponding to the original image, traversing all pixels of the background area in an order from the first side to the second side;
in response to that the virtual viewpoint corresponding to the target virtual viewpoint image is located at a second side of the reference viewpoint, traversing all pixels of the background area in an order from the second side to the first side.

3. An electronic apparatus, comprising:
one or more processors;
a memory configured to store one or more programs;
the one or more programs, when being executed by the one or more processors, cause the one or more processors to implement the virtual viewpoint synthesis method of claim 2.

4. A non-transitory computer-readable medium, storing a computer program which, when being executed by a processor, carries out steps of the virtual viewpoint synthesis method according to claim 2.

5. The virtual viewpoint synthesis method according to claim 1, wherein whether the two pixels belong to the same parallax plane is determined according to depth values corresponding to the two pixels.

6. An electronic apparatus, comprising:
one or more processors;
a memory configured to store one or more programs;

the one or more programs, when being executed by the one or more processors, cause the one or more processors to implement the virtual viewpoint synthesis method of claim 5.

7. A non-transitory computer-readable medium, storing a computer program which, when being executed by a processor, carries out steps of the virtual viewpoint synthesis method according to claim 5.

8. The virtual viewpoint synthesis method according to claim 1, wherein the generating the virtual viewpoint images corresponding to the plurality of virtual viewpoints respectively according to the processed depth image and the original image comprises:
- determining a distance value corresponding to each pixel in the processed depth image according to the depth value of each pixel in the processed depth image;
- for any to-be-filled virtual viewpoint image in the virtual viewpoint images, determining a parallax value corresponding to each pixel in the to-be-filled virtual viewpoint image according to a corresponding focal length, a corresponding baseline width and the distance value corresponding to the pixel in the processed depth image; and
- determining, for the pixel in the to-be-filled virtual viewpoint image, a corresponding point of the pixel in the original image according to the parallax value corresponding to the pixel, and filling the pixel according to the pixel information of the corresponding point.

9. The virtual viewpoint synthesis method according to claim 8, wherein the determining, for the pixel in the to-be-filled virtual viewpoint image, the corresponding point of the pixel in the original image according to the parallax value corresponding to the pixel, and filling the pixel according to the pixel information of the corresponding point comprises:
- in response to that a plurality of corresponding points exist in the original image for a single pixel in the to-be-filled virtual viewpoint image, filling the single pixel according to the pixel information of one of the corresponding points with a largest depth value.

10. An electronic apparatus, comprising:
- one or more processors;
- a memory configured to store one or more programs;
- the one or more programs, when being executed by the one or more processors, cause the one or more processors to implement the virtual viewpoint synthesis method of claim 9.

11. A non-transitory computer-readable medium, storing a computer program which, when being executed by a processor, carries out steps of the virtual viewpoint synthesis method according to claim 9.

12. An electronic apparatus, comprising:
- one or more processors;
- a memory configured to store one or more programs;
- the one or more programs, when being executed by the one or more processors, cause the one or more processors to implement the virtual viewpoint synthesis method of claim 8.

13. A non-transitory computer-readable medium, storing a computer program which, when being executed by a processor, carries out steps of the virtual viewpoint synthesis method according to claim 8.

14. An electronic apparatus, comprising:
- one or more processors;
- a memory configured to store one or more programs;
- the one or more programs, when being executed by the one or more processors, cause the one or more processors to implement the virtual viewpoint synthesis method of claim 1.

15. A non-transitory computer-readable medium, storing a computer program which, when being executed by a processor, carries out steps of the virtual viewpoint synthesis method according to claim 1.

* * * * *